United States Patent
Wilkes

(10) Patent No.: US 6,651,698 B1
(45) Date of Patent: Nov. 25, 2003

(54) SUPPRESSOR FOR MANIFOLD FLUID LINE

(75) Inventor: Roy G. Wilkes, Barrington, IL (US)

(73) Assignee: Wilkes & McLean Ltd., Schaumburg, IL (US)

( * ) Notice: Subject to any disclaimer, the term of this patent is extended or adjusted under 35 U.S.C. 154(b) by 0 days.

(21) Appl. No.: 10/159,660

(22) Filed: May 31, 2002

(51) Int. Cl.⁷ .............................. F16L 55/04
(52) U.S. Cl. ........................ 138/30; 138/26
(58) Field of Search ................... 138/30, 26

(56) References Cited

U.S. PATENT DOCUMENTS

| | | | | |
|---|---|---|---|---|
| 2,967,744 A | * | 1/1961 | Davies | 138/31 |
| 3,380,480 A | * | 4/1968 | Bleasdale | 138/30 |
| 3,477,464 A | * | 11/1969 | Ryan | 138/26 |
| 3,857,413 A | | 12/1974 | Zahid | |
| 3,893,485 A | * | 7/1975 | Loukonen | 138/30 |
| 4,032,265 A | * | 6/1977 | Miller | 138/30 |
| 4,449,552 A | * | 5/1984 | Porel | 138/30 |
| 4,497,388 A | * | 2/1985 | Dexter | 138/30 |
| 4,721,444 A | | 1/1988 | Pareja | |
| 4,759,387 A | | 7/1988 | Arendt | |
| 4,838,316 A | | 6/1989 | Sugimura | |
| 4,872,486 A | | 10/1989 | Sugimura et al. | |
| 5,094,433 A | | 3/1992 | Dan et al. | |
| 5,337,791 A | | 8/1994 | Plager et al. | |
| 6,164,336 A | * | 12/2000 | Pasquet et al. | 138/30 |

* cited by examiner

*Primary Examiner*—James Hook
(74) *Attorney, Agent, or Firm*—Wood, Phillips, Katz, Clark & Mortimer

(57) ABSTRACT

A suppressor for a fluid line in a manifold, including a mounting body removably securable to the manifold, and a diffuser attached to the mounting body and located in the fluid line when the mounting body is secured to the manifold. A charge bladder is secured to the mounting body and disposed inside the diffuser, and a charging valve is secured to the mounting body for charging gas through the mounting body into the interior of the charge bladder. A discharge opening is between the charge bladder interior and an opening in the mounting body adjacent the manifold when the suppressor is secured to the manifold, and a seal is securable over the discharge opening and between the mounting body and the manifold when the mounting body is secured to the manifold. The seal alone is structurally incapable of preventing discharge of charge gas from the charge bladder, but prevents discharge of charge gas from the charge bladder when the mounting body is secured to the manifold.

17 Claims, 3 Drawing Sheets

SUPPRESSOR FOR MANIFOLD FLUID LINE

BACKGROUND OF THE INVENTION

The present invention is directed toward suppressors, and particularly toward suppressors for manifolds.

Suppressors are commonly used to absorb pulsations and suppress shocks in fluid lines, such as hydraulic systems. Such devices can include a cylindrical pressure vessel having a resilient diaphragm or bladder therein together with a valve extending through the pressure vessel for charging the pressure chamber defined between the diaphragm and wall of the pressure vessel with a gas such as nitrogen. With this arrangement, pulses and shocks in the hydraulic system act against the resilient diaphragm in opposition to the nitrogen charged pressure chamber.

For example, suppressors are conventionally charged with nitrogen at a percentage of the minimum hydraulic operating pressure. If the hydraulic fluid is oil, the oil has a free and unrestricted flow path through a tube extending between an inlet and an outlet and through radial holes in the tube which serves to act against the diaphragm or bladder on the side opposite that which has been subjected to the nitrogen charge. As hydraulic shock or pulses occur, the diaphragm expands against the nitrogen charge, thus absorbing the shock or pulse to protect the hydraulic system. Such a structure is shown, for example, in U.S. Pat. No. 4,759,387.

Pulsation dampers commonly also have an inlet and an outlet which are connected at both points to the fluid line. Such structures are therefore naturally limited in their placement, and in particular are not readily adaptable to all installations, particularly those with limited available space. The above referenced U.S. Pat. No. 4,759,387, as well as U.S. Pat. Nos. 3,857,413, 4,721,444, 4,838,316, 4,872,486, and 5,337,791, all disclose pulsation dampers with an inlet and outlet, and usually directly connected in a line.

Also, in high pressure applications, it will be recognized that the charged gas may itself be at high pressure. If a bladder is charged at high pressure and not suitably contained, however, such as can occur when the pulsation damper is removed from the hydraulic system for maintenance or the like, the bladder can present a particular safety concern should it burst.

SUMMARY OF THE INVENTION

In one aspect of the invention, a suppressor for a fluid line in a manifold is provided, including a mounting body removably securable to the manifold, a diffuser attached to the mounting body and located in the fluid line when the mounting body is secured to the manifold, a charge bladder secured to the mounting body and disposed inside the diffuser, and a charging valve secured to the mounting body for charging gas through the mounting body into the interior of the charge bladder.

In one form of this aspect of the invention, the diffuser is a substantially cylindrical body with openings therethrough.

In another form, the suppressor further includes a discharge opening between the charge bladder interior and an opening in the mounting body adjacent the manifold when the suppressor is secured to the manifold, and a seal securable over the discharge opening and between the mounting body and the manifold when the mounting body is secured to the manifold whereby the seal prevents discharge of charge gas from the charge bladder when the mounting body is secured to the manifold.

In still another form, the charging valve includes an opening through the mounting body, and the discharge opening comprises a passage through the mounting body between the charging valve opening and the opening in the mounting body adjacent the manifold when the suppressor is secured to the manifold.

In yet another form, the mounting body includes a generally cylindrical outer surface with threads therearound for mounting in a threaded cylindrical opening in the manifold. Further, the discharge opening may be through the cylindrical outer surface and the seal is an O-ring disposed about the cylindrical outer surface and over the discharge opening, the O-ring being secured against the discharge opening by the manifold when the mounting body is threaded into the manifold threaded cylindrical opening.

In another aspect of the invention, a manifold is provided, including a manifold body defining a fluid path with an externally accessible opening through which the fluid path passes, and a suppressor removably received in the externally accessible opening and allowing passage of fluid through the opening. The suppressor includes a mounting body removably secured in the manifold body, where the mounting body blocks external access to the manifold body opening. The suppressor also includes a diffuser attached to the mounting body and extending into the manifold body opening, a charge bladder secured to the mounting body and disposed inside the diffuser, and a charging valve secured to the mounting body for charging gas through the mounting body into the interior of the charge bladder.

In one form, the manifold body opening is substantially cylindrical and the diffuser is a substantially cylindrical body with openings therethrough.

In another form, the manifold body and the mounting body have adjacent surfaces, with there further being a discharge opening between the charge bladder interior and the mounting body adjacent surface, and a seal over the discharge opening and between the mounting body and manifold body adjacent surfaces whereby the adjacent surfaces secure the seal over the discharge opening to prevent discharge of charge gas from the charge bladder.

In yet another form, the charging valve includes an opening through the mounting body, and the discharge opening comprises a passage through the mounting body between the charging valve opening and the mounting body adjacent surface.

In still another form, the mounting body adjacent surface is generally cylindrical with threads therearound secured to threads in the manifold body externally accessible opening.

In another form, the seal is an O-ring disposed about the generally cylindrical mounting body adjacent surface, the O-ring being secured against the discharge opening by the manifold when the mounting body is threaded into the manifold threaded cylindrical opening.

In still another form, the seal alone is structurally incapable of preventing discharge of charge gas from the charge bladder.

In yet another form, the seal is an elastic O-ring.

DETAILED DESCRIPTION OF THE INVENTION

Figure 1:
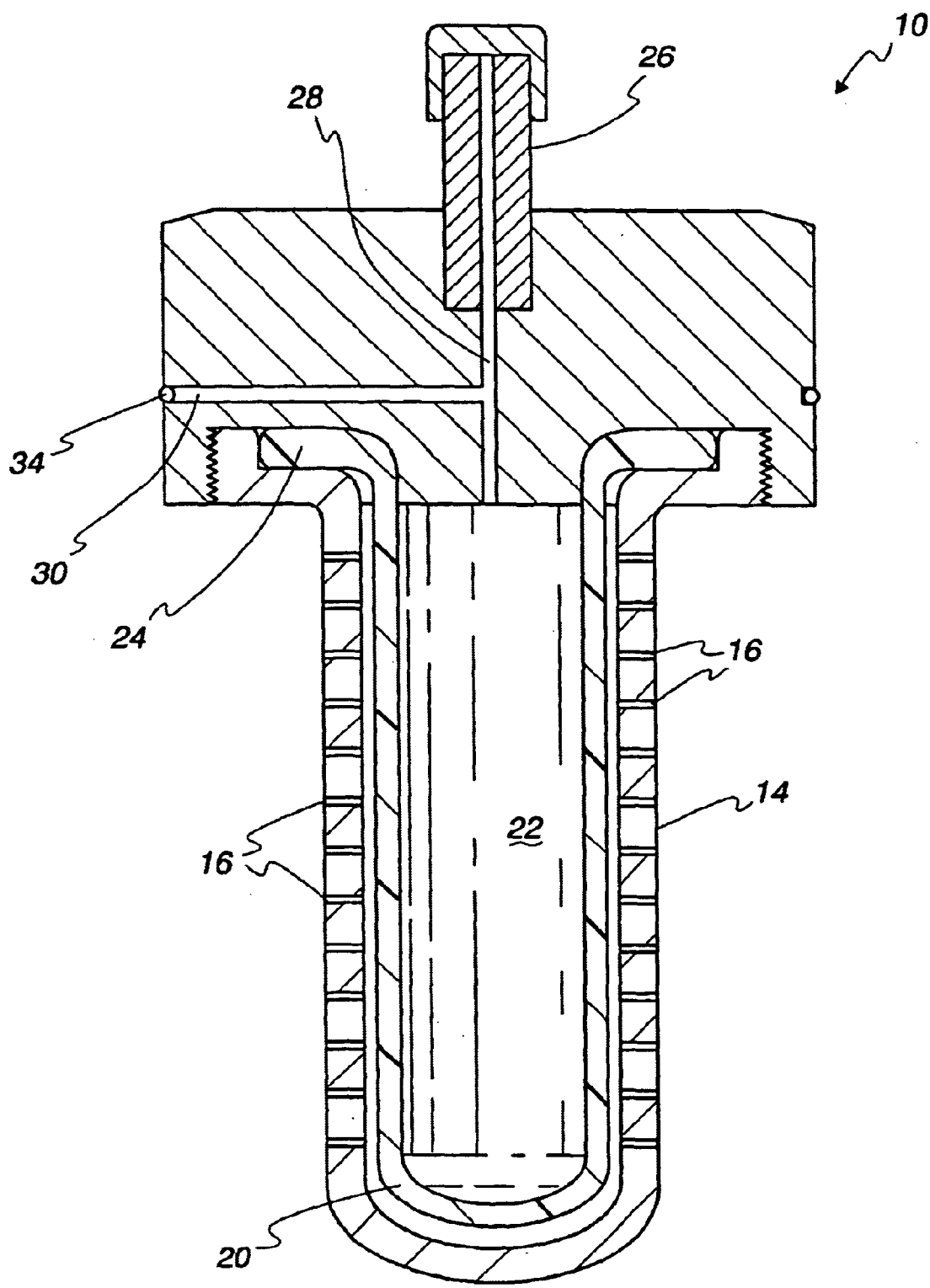
FIG. 1 is a cross sectional view along the axis of a first embodiment of a suppressor according to the present invention.

One embodiment of a suppressor 10 according to the present invention is shown in FIG. 1.

The suppressor 10 includes a top cover or mounting body 12 suitably secured to a diffuser 14 which may be in a generally closed cylindrical shape with a plurality of openings therethrough.

A flexible or elastic charge bladder 20 is disposed inside the diffuser 14 and is suitably secured therein so that its interior 22 defines a gas-tight enclosure. For example, as illustrated in FIG. 1, a flange 24 at its upper end may be secured between the diffuser 14 and the mounting body 12.

A suitable charging valve 26 is provided on the mounting body 12, and an opening 28 through the mounting body 12 from the charging valve 26 to the bladder interior 22 enables pressurized gas to be charged into the bladder 20. The charging valve 26 may be any suitable structure for allowing the charging of such gas, preferably whereby the pressurized gas source may be disconnected after charging without releasing the pressurized gas from the charge bladder 20.

In use, the suppressor 10 may be secured in a manifold as described below, whereby the diffuser 14 and charge bladder 20 are disposed in a fluid line so that pulsations in the fluid in the fluid line will be absorbed by passing of the fluid through the diffuser openings 16 and compression of the charge bladder 20 and the pressurized gas in its interior 22.

In one form of the invention, a discharge opening 30 extends from the mounting body opening 28 to a location on the exterior surface of the mounting body 12. A suitable seal 34 is located over the discharge opening 30.

The seal 34 alone is incapable of closing the discharge opening 30 to maintain significant pressure inside the discharge opening 30 (and therefore the mounting body opening 28 and charge bladder 20). However, when the suppressor 10 is secured in place, such as in a manifold, the manifold is disposed over the seal 34 to hold it in place.

As illustrated in FIG. 1, the seal 34 is an O-ring disposed around the mounting body 12. The seal 34 may be flexible and/or elastic so that it will seal the discharge opening, though in its broadest configuration the seal 34 should simply be provided so that it is generally located over the discharge opening 30 and will seal that opening 30 when the suppressor 10 is mounted in place for operation but will be unseated to allow discharge of pressurized gas when the suppressor 10 is removed.

Figure 2:
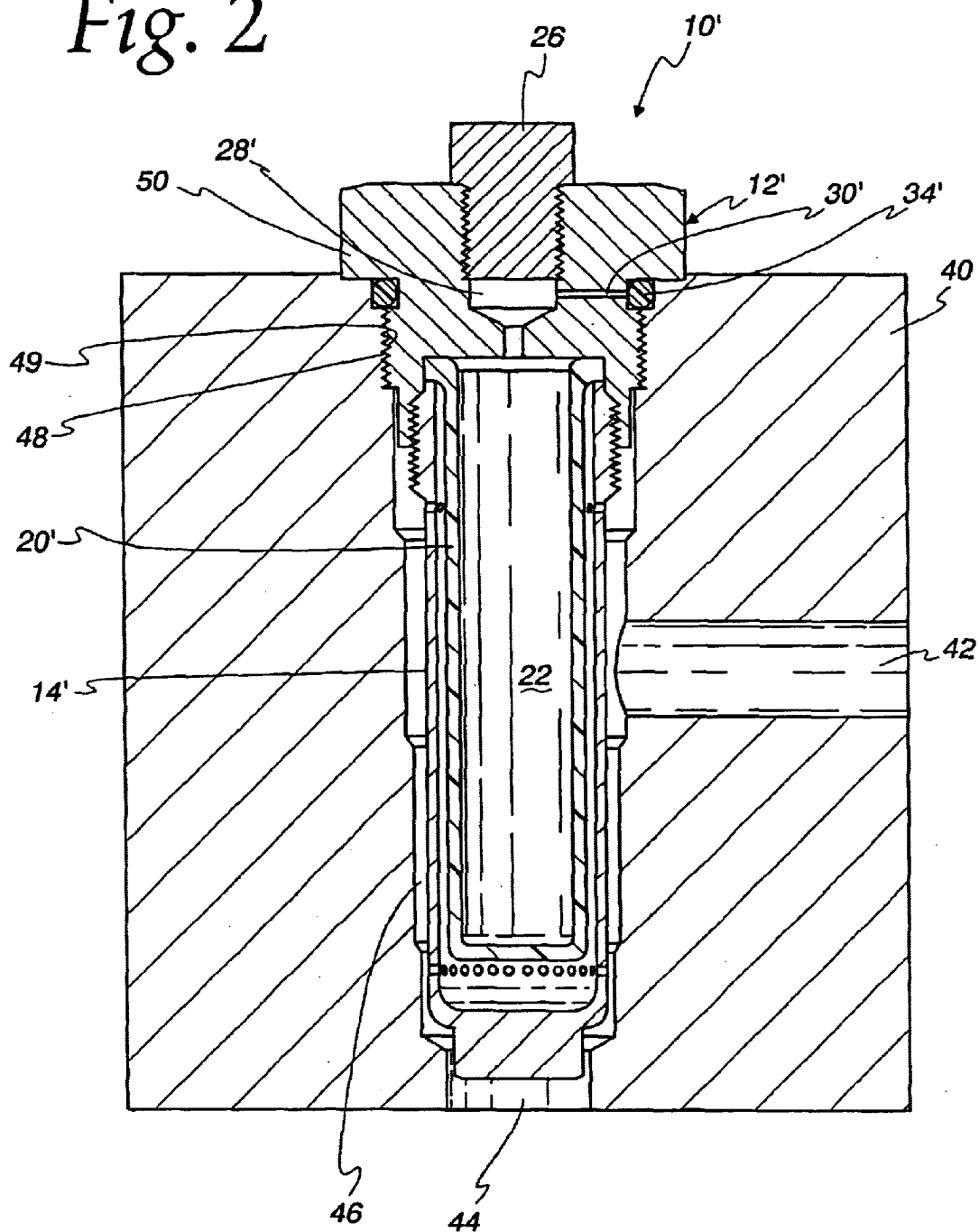
FIG. 2 is a cross sectional view of a second embodiment similar to the first, with the suppressor mounted in a manifold.
Figure 3:
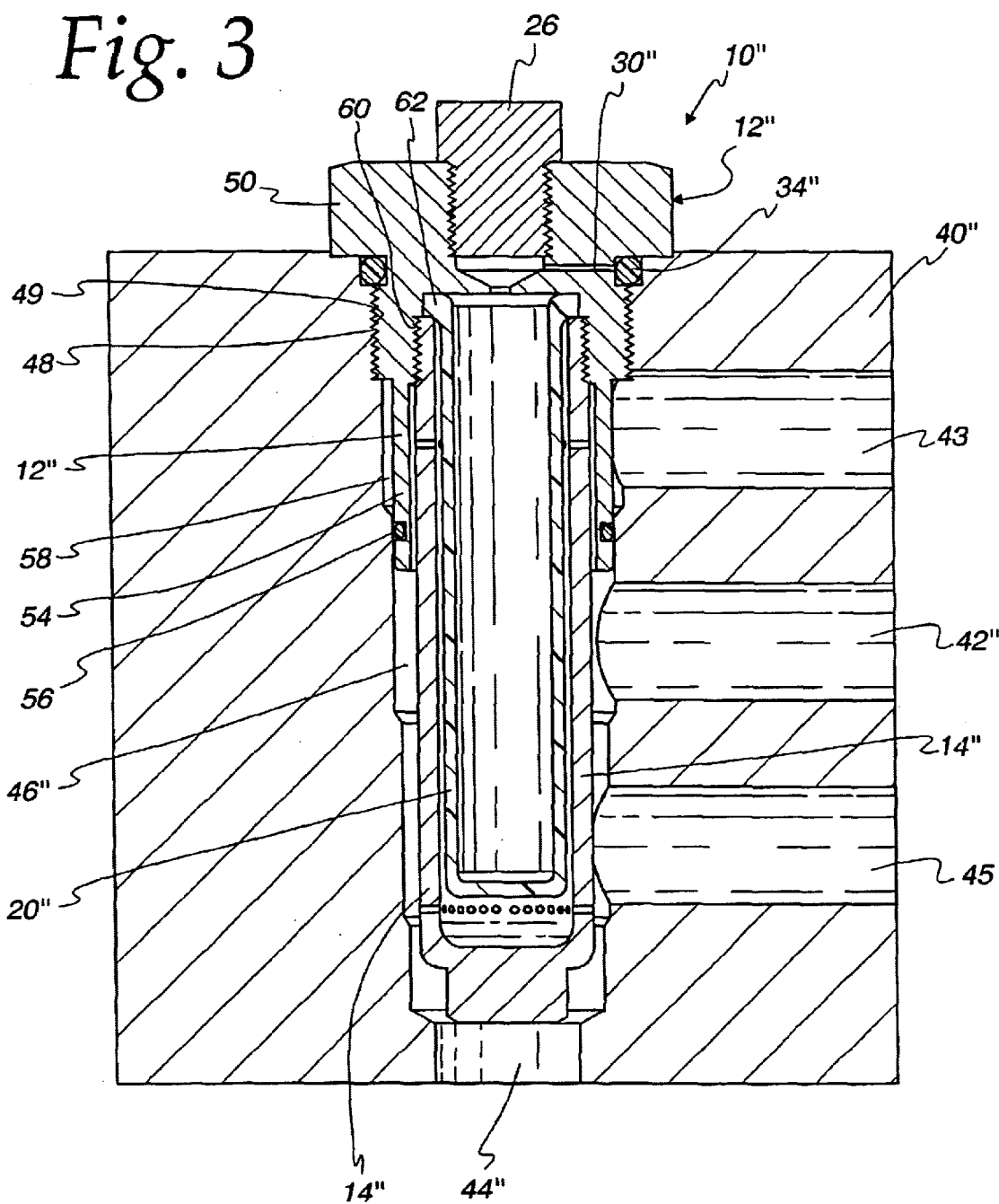
FIG. 3 is a cross sectional view of a third embodiment, with the suppressor mounted in another manifold.

FIGS. 2–3 illustrate two additional embodiments of the present invention as used with different manifolds. Like reference numerals are used with like parts, and similar but modified parts are identified by like reference numerals with prime (') and double prime (") added in FIGS. 2 and 3 respectively (e.g., mounting body 12 is identified as 12' in FIG. 2 and 12" in FIG. 3).

Referring now to FIG. 2, the suppressor 10' is shown mounted for use in a manifold 40. The manifold 40 defines a fluid line having two supply lines 42, 44 interconnected by a component chamber 46 within which the suppressor 10' is secured. The suppressor 10' may be readily mounted in the manifold 40 by the connection of a threaded outer surface 48 on the mounting body 12' with a threaded interior surface 49 of the component chamber 46.

The mounting body 12' as illustrated includes an annular flange 50 at its upper end (in the vertical orientation of the Figures) which seats against the upper surface of the manifold 40 when properly secured thereto. In the FIG. 2 embodiment, the discharge opening 30' extends to an outlet just beneath the annular flange 50, with the seal 34' thereby secured over the outlet by the manifold 40 when the suppressor 10' is secured to the manifold 40, thereby preventing leaking of pressurized gas.

Accordingly, pulses in fluid in supply lines 42, 44 will be absorbed (suppressed) by the suppressor 10' as the pulses enter the chamber 46. Such functioning can further be readily achieved in a modular fashion, with conventional manifolds 40 with component chambers used. For example, the chambers which may, in some applications, be used to connect different fluid supply lines, could be used to easily locate the suppressor 10' in a fluid line.

Further, if the discharge opening 30' and seal 34' are used as described, the suppressor 10' may be easily and securely charged while in place. Moreover, such suppressor 10' may be safely used, inasmuch as it will safely discharge the pressurized gas immediately upon removal of the suppressor 10' from the manifold 40 (since the seal 34' will be pushed aside by the pressurized gas when the manifold is not over the seal 34' to secure it in place). Therefore, the dangers of damage and/or injury from handling suppressors which unknowingly have high pressure gas can be avoided.

Referring now to FIG. 3, the suppressor 10" is shown mounted for used in another manifold 40". The manifold 40" defines a fluid line having at least four supply lines 42", 43, 44", 45 interconnected by a component chamber 46" within which the suppressor 10" is secured.

The mounting body 12" of the suppressor 10" includes a cylindrical flange 54 at its lower end (in the orientation of the Figures, it being understood that the actual orientation of the components to horizontal can be different from the orientation in the Figures) with an O-ring 56 around its lower end sealing the supply line 43 from the other supply lines 42", 44", 45. The supply line 43 may thus be connected by chamber 58 around the flange 54 to another supply line (not seen in the sectional view of FIG. 3), without having the pulse dampening of the suppressor 10" for that supply line 43. It can be seen that a manifold 40" having separate supply lines can therefore readily be run through a manifold 40", with the suppressor 10" dampening pulses in only one of the supply lines if so desired.

The suppressor 10" may be readily mounted in the manifold 40" by the connection of a threaded outer surface 48 on the mounting body 12" with a threaded interior surface 49 of the component chamber 46".

The mounting body 12' as illustrated includes an annular flange 50 at its upper end (in the vertical orientation of the Figures) which seats against the upper surface of the manifold 40" when properly secured thereto. In the FIG. 3 embodiment, as in the FIG. 2 embodiment, the discharge opening 30" extends to an outlet just beneath the annular flange 50, with the seal 34" thereby secured over the outlet by the manifold 40" when the suppressor 10" is secured to the manifold 40", thereby preventing leaking of pressurized gas.

Accordingly, pulses in fluid in supply lines 42", 44", 45 will be absorbed (suppressed) by the suppressor 10" as the pulses enter the chamber 46". Such functioning can also be readily achieved in a modular fashion, with conventional manifolds 40 with component chambers used. For example, the chambers which may, in some applications, be used to connect different fluid supply lines, could be used to easily locate the suppressor 10" in a fluid line.

Further, as with the FIG. 2 embodiment previously described, if the discharge opening 30" and seal 34" are used as described, the suppressor 10" may be easily and securely charged while in place. Moreover, such suppressor 10" may be safely used, inasmuch as it will safely discharge the pressurized gas immediately upon removal of the suppressor 10" from the manifold 40" (since the seal 34" will be pushed aside by the pressurized gas when the manifold is not over the seal 34" to secure it in place). Therefore, the dangers of damage and/or injury from handling suppressors which unknowingly have high pressure gas can be avoided.

In addition, as is also illustrated in FIGS. 1–2 showing the first two described embodiments, the mounting body 12" may be secured to the diffuser 14" by a threaded connection 60, with the upper end 62 of the charge bladder 20" compressed between the upper end of the diffuser 14" and the mounting body 12" to secure the charge bladder 20" therein. This enables the entire suppressor 10" to be conveniently sold and shipped as a unit rather than as piece parts. However, it should be understood that it would be within the broad scope of the an aspect of the invention to connect the mounting body 12" and diffuser 14" by other means. For example, if provided in piece parts, the diffuser 14" could be simply telescopically received in the mounting body 12", with the diffuser 14" sized to seat inside the manifold 40" so that as the mounting body 12" is threaded into the manifold 40" it is moved over and toward the end of the diffuser 14" to thereby compress the upper end 62 of the charging bladder 20" therebetween.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

What is claimed is:

1. A suppressor for a fluid line in a manifold, comprising:
    a mounting body removably securable to said manifold;
    a diffuser attached to said mounting body, said diffuser located in said fluid line when said mounting body is secured to said manifold;
    a charge bladder secured to said mounting body and disposed inside said diffuser, said charge bladder having an interior;
    a charging valve secured to said mounting body for charging gas through said mounting body into the interior of said charge bladder;
    a discharge opening between said charge bladder interior and an opening in said mounting body adjacent said manifold when said suppressor is secured to said manifold; and
    a seal securable over said discharge opening and between said mounting body and said manifold when said mounting body is secured to said manifold whereby said seal prevents discharge of charge gas from said charge bladder when said mounting body is secured to said manifold.

2. The suppressor of claim 1, wherein said charging valve includes an opening through said mounting body, and said discharge opening comprises a passage through said mounting body between said charging valve opening and said opening in said mounting body adjacent said manifold when said suppressor is secured to said manifold.

3. The suppressor of claim 1, wherein said mounting body includes a generally cylindrical outer surface with threads therearound for mounting in a threaded cylindrical opening in said manifold.

4. The suppressor of claim 3, wherein said discharge opening is through said cylindrical outer surface and said seal is an O-ring disposed about said cylindrical outer surface and over said discharge opening, said O-ring being secured against said discharge opening by said manifold when said mounting body is threaded into said manifold threaded cylindrical opening.

5. A manifold comprising:
    a manifold body defining a fluid path, said manifold body including an externally accessible opening through which said fluid path passes;
    a suppressor removably received in said externally accessible opening and allowing passage of fluid through said opening, said suppressor including
        a mounting body removably secured in said manifold body, said mounting body blocking external access to said manifold body opening, and said manifold body and said mounting body have having adjacent surfaces,
        a diffuser attached to said mounting body and extending into said manifold body opening,
        a charge bladder secured to said mounting body and disposed inside said diffuser, said charge bladder having an interior, and
        a charging valve secured to said mounting body for charging gas through said mounting body into the interior of said charge bladder:
    a discharge opening between said charge bladder interior and said mounting body adjacent surface; and
    a seal over said discharge opening and between said mounting body and manifold body adjacent surfaces whereby said adjacent surfaces secure said seal over said discharge opening to prevent discharge of charge gas from said charge bladder.

6. The manifold of claim 5, wherein said charging valve includes an opening through said mounting body, and said discharge opening comprises a passage through said mounting body between said charging valve opening and said mounting body adjacent surface.

7. The manifold of claim 5, wherein said mounting body adjacent surface is generally cylindrical with threads therearound secured to threads in said manifold body externally accessible opening.

8. The manifold of claim 7, wherein said seal is an O-ring disposed about said generally cylindrical mounting body adjacent surface, said O-ring being secured against said discharge opening by said manifold when said mounting body is threaded into said manifold threaded cylindrical opening.

9. The manifold of claim 5, wherein said seal alone is structurally incapable of preventing discharge of charge gas from said charge bladder.

10. The manifold of claim 5, wherein said seal is an elastic O-ring.

11. A modular fluid line, comprising:
    a modular manifold body defining a fluid path having first and second fluid supply lines connected by a component chamber, said chamber being externally accessible through an opening having a threaded interior surface;
    a suppressor removably secured in said component chamber and allowing passage of fluid from said first fluid supply line to said second fluid supply line through said component chamber, said suppressor including
        a mounting body removably secured in said manifold body component chamber, said mounting body being threaded into said threaded interior surface and blocking external access to said manifold body component chamber, a diffuser attached to said mounting body and positioned in said manifold body component chamber, a charge bladder secured to said mounting body and disposed inside said diffuser, said charge bladder having an interior, and a charging valve secured to said mounting body for charging gas through said mounting body into the interior of said charge bladder.

12. The modular fluid line of claim 11, wherein said manifold body is a block, and said first and second fluid supply lines and component chamber comprise voids in said block.

13. The modular fluid line of claim 12, wherein said diffuser is a substantially cylindrical body with openings therethrough, said cylindrical body received in said component chamber and having a diameter less than said component chamber.

14. The modular fluid line of claim 11, wherein said mounting body includes an inner thread on a side facing said component chamber and said diffuser includes an outer thread releasably securable to said mounting body inner thread, said charge bladder including an annular opening compressed between said diffuser and said mounting body.

15. The modular fluid line of claim 14, wherein said charge valve is adapted to charge gas through an opening in said mounting body, and said bladder annular opening is disposed around said mounting body opening.

16. A suppressor for a fluid line in a modular manifold, said manifold including a component chamber with is externally accessible through an opening having a threaded interior surface, comprising:

a mounting body removably securable in said manifold body component chamber, said mounting body being threadable into said manifold threaded interior surface to block external access to said manifold body component chamber and having an inner thread on a side facing said component chamber;

a diffuser attached to said mounting body and positioned in said manifold body component chamber, said diffuser having an outer thread releasably secured to said mounting body inner thread;

a charge bladder secured to said mounting body and disposable inside said diffuser, said charge bladder having an interior and including an annular opening compressed between said diffuser and said mounting body; and a charging valve secured to said mounting body for charging gas through said mounting body into the interior of said charge bladder.

17. The suppressor of claim 16, wherein said charge valve is adapted to charge gas through an opening in said mounting body, and said bladder annular opening is disposed around said mounting body opening.

* * * * *